United States Patent Office.

ALEXANDER ANGUS CROLL, OF LONDON, ENGLAND.

*Letters Patent No. 65,175, dated May 28, 1867.*

IMPROVEMENT IN THE TREATMENT OF SULPHATE OF ALUMINA.

The Schedule referred to in these Letters Patent and making part of the same.

TO ALL TO WHOM IT MAY CONCERN:

Be it known that I, ALEXANDER ANGUS CROLL, of Coleman street, in the city of London, England, civil engineer, have invented "Improvements in the Treatment of Sulphate of Alumina;" and I do hereby declare that the following is a full and exact description thereof.

My improvements relate, first, to combining caustic lime or carbonate of lime with sulphate of alumina for the purpose of neutralizing free acid resulting from its manufacture. For this purpose I add the caustic lime or carbonate of lime to the sulphate of alumina whilst the sulphate of alumina is in a heated state, or before it has been allowed to cool down to 170° Fahrenheit, or much below that temperature; and I employ the carbonate of lime in the state of finely-powdered whiting, and in the proportions of about three per cent. of sulphate of alumina which has arrived at a sufficiently concentrated state to be capable of forming cake, or becoming stiff or solid when cool. These proportions will, however, be dependent upon the condition of neutrality desired to be obtained. The improvements also have for their object the obtaining a soluble sulphate of alumina with increased rapidity, economy, and quantity, considered in relation to the quantities of clay or other aluminous base, and of acid under operation, and the time employed in obtaining the results. For this purpose I take, say, five parts, by weight, of oil of vitriol, specific gravity 1.845, diluted with water to the specific gravity of, say, .74 Twaddle, and heated to about 220° Fahrenheit, at which temperature the specific gravity will show about 65 Twaddle. To this diluted acid I add about four parts, by weight, of thoroughly dry and finely-divided aluminous clay which has been previously roasted. These proportions may, however, be varied, dependent, in great measure, upon the quantity of alumina in the base operated upon; and the heat may be applied to the aluminous base with cold dilute acid.

I claim as new, and desire to secure by Letters Patent—

The employment of carbonate of lime with the sulphate of alumina, when the latter is in a heated state, substantially as herein described.

The treatment of the roasted aluminous earth or clay with hot oil of vitriol, substantially as herein described.

In testimony whereof I have signed my name to this specification in the presence of two subscribing witnesses.

A. ANGUS CROLL.

Witnesses:
  JAMES E. NAYLOR,
  JNO. WILLSDON.